(12) United States Patent
Huang

(10) Patent No.: US 9,110,980 B2
(45) Date of Patent: Aug. 18, 2015

(54) SEARCHING AND MATCHING OF DATA

(71) Applicant: Business Objects Software Limited, Dublin (IE)

(72) Inventor: Xinrong Huang, Shanghai (CN)

(73) Assignee: BUSINESS OBJECTS SOFTWARE LIMITED (IE)

( * ) Notice: Subject to any disclaimer, the term of this patent is extended or adjusted under 35 U.S.C. 154(b) by 248 days.

(21) Appl. No.: 13/767,846

(22) Filed: Feb. 14, 2013

(65) Prior Publication Data

US 2014/0222416 A1      Aug. 7, 2014

(30) Foreign Application Priority Data

Feb. 4, 2013   (CN) .......................... 2013 1 0044062

(51) Int. Cl.
*G06F 17/27*   (2006.01)
*G06F 17/28*   (2006.01)
*G06F 17/20*   (2006.01)
*G06F 17/30*   (2006.01)
*G06F 17/22*   (2006.01)

(52) U.S. Cl.
CPC ...... *G06F 17/30687* (2013.01); *G06F 17/2223* (2013.01); *G06F 17/2863* (2013.01)

(58) Field of Classification Search
CPC .............. G06F 17/27; G06F 17/30687; G06F 17/2223; G06F 17/289; G06F 17/30675; G06F 3/0236; G06K 9/0049

USPC ....................... 704/2, 8, 9; 715/257; 707/769, 707/E17.014, 760
See application file for complete search history.

(56) References Cited

U.S. PATENT DOCUMENTS 6,226,638 B1 *    5/2001  Okura et al. .......................... 1/1
8,321,442 B2     11/2012  Huang
8,374,847 B2 *    2/2013  Ku et al. ............................ 704/9
2011/0106523 A1 * 5/2011  Maeda et al. ...................... 704/2

OTHER PUBLICATIONS

Ekmekçioglu et al., Stemming and N-gram matching for term conflation in Turkish texts, Information Research, Oct. 1996, vol. 2, No. 2.
Binstock et al., Practical Algorithms for Programmers (Reading, MA: Addison-Wesley), Phonetic Comparisons: Soundex, 1995, pp. 158-163, Jun. 1995.
Lawrence Philips, The Double Metaphone Search Algorithm, C/C++ Users Journal, Jun. 2000.

* cited by examiner

*Primary Examiner* — Charlotte M Baker
(74) *Attorney, Agent, or Firm* — Horizon IP Pte. Ltd.

(57) ABSTRACT

Described herein is a technology for facilitating searching and matching of data. In accordance with one implementation, first and second feature sets are extracted. The first feature set is associated with an input data string including one or more first ideographic elements, while the second feature set is associated with a candidate string including one or more second ideographic elements. A match score of the candidate string is determined based on the first and second feature sets.

22 Claims, 19 Drawing Sheets

| ID | VALUE |
|---|---|
| 1 | hans |
| 2 | gans |
| 3 | haas |
| 4 | hens |

```
SELECT SCORE() AS score, *
FROM    TABLE
WHERE   CONTAINS(VALUE,'hans', FUZZY(0.5))
ORDER BY score DESC;
```

218

| ID | VALUE |
|---|---|
| 1 | hans |
| 2 | gans |
| 3 | haas |
| 4 | hens |

Fig. 4a

```
SELECT SCORE() AS score, *
FROM    TABLE
WHERE   CONTAINS(VALUE,'hans', FUZZY(0.5))
ORDER BY score DESC;
```

| SCORE | ID | VALUE |
|---|---|---|
| 1 | 1 | hans |
| 0.67 | 2 | gans |
| 0.67 | 3 | hens |

Fig. 4c (i) Silent element = "H"

(ii) Silent elements = "H" and "G"

(iii) Silent elements = "U" and "G"

(iv) Silent element = "U"

(v) Silent elements = "H" and "I"

(i) Sound-alike (X) = "S"

(ii) Sound-alike (J) = "Z"

(iii) Sound-alike (X) = "S"
Silent element = "I"

(i) Mandarin and Shanghainese (ii) Mandarin and Cantonese

| 702 Strings | 704a Mono-grams | 704b Bi-grams | 704c Mono-grams + Bi-grams | 704d Mono-grams + Bi-grams + Extra grams |
|---|---|---|---|---|
| hans | h, a, n, s | ha, an, ns | h, ha, a, an, n, ns, s | _h, h, ha, a, an, n, ns, s, s_ |
| gans | g, a, n, s | ga, an, ns | g, ga, a, an, n, ns, s | _g, g, ga, a, an, n, ns, s, s_ |
| haas | h, a, a, s | ha, aa, as | h, ha, a, aa, a, as, s | _h, h, ha, a, aa, a, as, s, s_ |
| hens | h, e, n, s | he, en, ns | h, he, e, en, n, ns, s | _h, h, he, e, en, n, ns, s, s_ |

Fig. 7a

| | Mono-gram of Chinese Character | Bi-grams of Phonetic spelling | Mono-gram of Phonetic Key | Match Score |
|---|---|---|---|---|
| 801a | 上, 海 | SH, HA, AN, NG, GH, HA, AI | SANHA | (1/3*2/2 + 1/3*7/7 + 1/3*1/1)*100 % =100 % |
| 801b | 伤, 害 | SH, HA, AN, NG, GH, HA, AI | SANHA | (1/3*0/2 + 1/3*7/7 + 1/3*1/1)*100 % = 67 % |
| 801c | 山, 海 | SH, HA, AN, NH, HA, AI | SANHA | (1/3*1/2 + 1/3*5/7 + 1/3*1/1)*100 % = 74 % |
| 801d | 三, 害 | SA, AN, NH, HA, AI | SANHA | (1/3*0/2 + 1/3*3/7 + 1/3*1/1)*100 % = 48 % |

Columns labeled: 811, 812, 813, 816

| Chinese Character | Radical Bi-grams (912) | Match Score (914) |
|---|---|---|
| 洗 (901a) | IT, TF, FG | 100%*3/3 = 100 % |
| 洗 (901b) | UT, TF, FG | 100%*2/3 = 67 % |

Fig. 9b

| Chinese Character (901) | Radical Key (916) | Match Score (914) |
|---|---|---|
| 洗 (901a) | UTFG | (1/2*1/1 + 1/2*1/1) *100%= 100% |
| 洗 (901b) | UTFG | (1/2*0/1 + 1/2*1/1) *100% = 50% |

| Chinese Character | Radical Bi-grams | Match Score |
|---|---|---|
| 洗 | IT, TF, FG | (1/2*1/1+1/2*3/3)*100% = 100 % |
| 洗 | UT, TF, FG | (1/2*0/1+1/2*2/3)*100% = 33% |

901a, 901b under Chinese Character column; 901 labels Chinese Character; 918 labels Radical Bi-grams; 914 labels Match Score.

Fig. 9c

| Chinese Character | Stroke Bi-grams | Match Score |
|---|---|---|
| 洗 | 44, 41, 13, 31, 12, 21, 13, 35 | 8/8*100% = 100% |
| 洗 | 41, 13, 31, 12, 21, 13, 35 | 7/8*100% = 88% |

Fig. 10a

| Chinese Character | Stroke Key | Match Score |
|---|---|---|
| 洗 | 41312135 | (1/2*1/1+1/2*1/1)*100% = 100% |
| 洸 | 41312135 | (1/2*0/1+1/2*1/1)*100% = 50% |

Fig. 10b

| Chinese Character | Stroke Bi-grams | Match Score |
|---|---|---|
| 洗 | 44, 41, 13, 31, 12, 21, 13, 35 | (1/2*1/1 + 1/2*8/8)*100% = 100% |
| 洸 | 41, 13, 31, 12, 21, 13, 35 | (1/2*0/1 + 1/2*7/8)*100% = 44% |

Fig. 10c

SEARCHING AND MATCHING OF DATA

TECHNICAL FIELD

The present disclosure relates generally to searching and matching of data.

BACKGROUND

Searching and matching techniques provide useful ways to retrieve data from databases. Fuzzy string matching (non-exact or approximate string matching) is a technique of finding strings (or data) that match a pattern approximately, rather than exactly. One exemplary application of fuzzy matching is broadening the search results for a given input. Another exemplary application is cleansing and standardizing data to improve its quality. For example, some data in the database may be incorrect due to user input errors. Common sources of errors include entering strings that "look-like" or "sound-like" the intended data. Such input data may be corrected by retrieving a candidate record from the reference universe that approximately matches the incorrect input data, and replacing the incorrect input data with the matching candidate data before storing it in the database.

One type of fuzzy matching technique is the Soundex algorithm, which was first developed by Robert C. Russell and Margaret K. Odell in 1918 and 1922. See U.S. Pat. Nos. 1,261,167 and 1,435,663, which are hereby incorporated by reference. The Soundex algorithm indexes data by sound, as pronounced in English, by encoding homophones to the same representation or key, so that they can be matched despite minor differences in spelling. To compare two given strings, the Levenshtein distance (or edit distance) may be determined. The Levenshtein distance measures the difference between two strings by calculating the least number of edit operations that are necessary to modify one string to obtain another string. The problem with conventional algorithms, however, is that they are not well-suited for ideographic or non-English characters, such as Chinese or Japanese characters. The phonetic rules used in conventional phonetic algorithms are designed for English pronunciations, and not for pronunciations of other languages. In addition, conventional phonetic algorithms do not take into account of possible different pronunciations by different dialect groups. Even further, the cost of computing the Levenshtein distance is roughly proportional to the product of the two string lengths, which makes it impractical for longer strings or large datasets.

Accordingly, there exists a need for new and innovative solutions for searching and matching ideographic and non-English characters.

SUMMARY

A computer-implemented technology for facilitating searching and matching of data is described herein. In accordance with one aspect, first and second feature sets are extracted. The first feature set is associated with an input data string including one or more first ideographic elements, while the second feature set is associated with a candidate string including one or more second ideographic elements. A match score of the candidate string is determined based on the first and second feature sets.

In accordance with another aspect, an input data string including one or more first ideographic elements is received. Further, a candidate string including one or more second ideographic elements is received. A first feature set associated with the input data string and a second feature set associated with the candidate string are extracted. The first and second feature sets include n-grams of phonetic and shape features. A match score of the candidate string is determined based on the first and second feature sets.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4a illustrates a portion of an exemplary reference database;

FIG. 4b shows exemplary SQL query statements;

FIG. 4c shows an exemplary results table;

FIG. 7a shows an exemplary generation of n-grams;

FIG. 8 illustrates an exemplary match score computation technique based at least in part on phonetic and shape features;

FIGS. 9a-c illustrate exemplary match score computation techniques based at least in part on shape features; and FIGS. 10a-c illustrate other exemplary match score computation techniques based at least in part on shape features.

DETAILED DESCRIPTION

Figure 1:
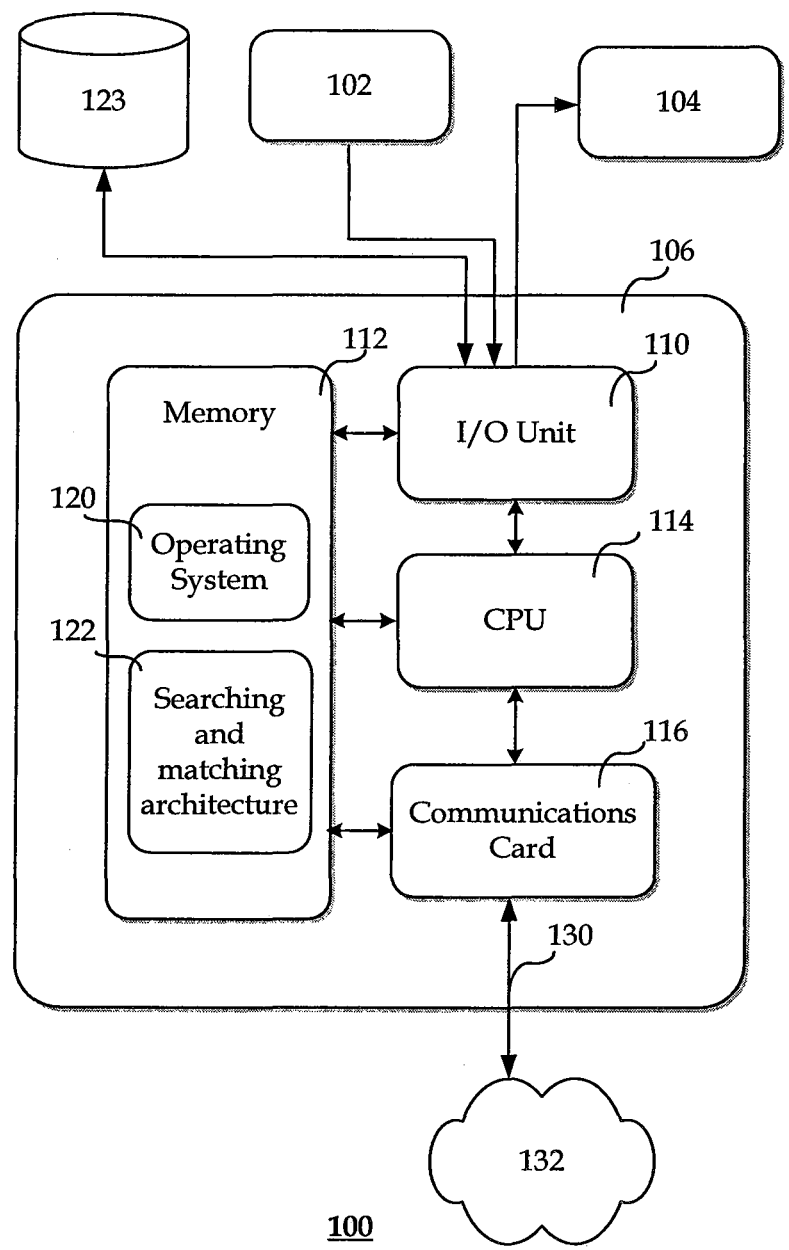
FIG. 1 is a block diagram illustrating an exemplary system.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent in their performance.

A framework for searching and matching of data is described herein. The searching and matching framework may be used, for example, to facilitate correction of errors in input data so as to ensure high data quality. Errors that may be corrected include, for example, common editorial mistakes or "sounds-like" and/or "looks-like" misspellings. One significant advantage of the present framework is its compatibility with ideographic, logographic or non-Latin-based strings, such as Chinese, Japanese, Korean or Vietnamese, and their respective dialects.

In accordance with one aspect of the present framework, a match (or similarity) score is determined when a candidate string is retrieved from the reference database in response to receiving an input data string. The match score may be determined based on a first feature set associated with the input data string and a second feature set associated with the candidate string. The first and second feature sets may include phonetic features, shape features, n-grams of phonetic features, n-grams of shape features, or any combination thereof.

An n-gram is a set of n consecutive characters that are extracted from a string or given sequence of text. An n-gram can have a size of n, where n is a positive integer equal to or larger than 1. An n-gram of size 1 (n=1) is referred to as a "mono-gram", size 2 (n=2) is a "bi-gram", size 3 is a "tri-gram", size 4 (n=4) is a "four-gram" and so forth. N-grams are used in computational linguistics. A common use is in spell checkers where a candidate correct word is offered when it shares many n-grams with a misspelled word. Conventional n-gram matching techniques do not take into account causes (e.g., sound-like or look-like) of misspellings in the input query string that commonly result from human error. Moreover, such techniques are not well-designed for Asian languages (e.g., Chinese) due to the short format of the Latin-based representation of each ideographic element. One aspect of the present framework combines a new fuzzy search approach with an n-gram approximate matching technique to yield higher efficiency and accuracy in database retrieval.

The framework described herein may be implemented as a method, computer-controlled apparatus, a computer process, a computing system, or as an article of manufacture such as a computer-usable medium. These and various other features will be apparent from the following description.

Exemplary System

FIG. 1 shows a block diagram illustrating an exemplary system 100 that may be used to implement the framework described herein. System 100 may include a computer system 106 communicatively coupled to an input device 102, an output device 104 and a peripheral storage device 123.

Input device 102 may be specially designed for entry of ideographic characters. For example, the input device 102 may include a keyboard where each key corresponds to a particular stroke type (horizontal, vertical, left-falling, right-falling, turning, etc.). Alternatively, the input device 102 may include a pen and a graphics tablet for use by a user to naturally write the entire character on the tablet. A handwriting recognition system may be used to find the character that most closely matches the strokes entered by the user on the tablet. Other types of input devices, such as a QWERTY keyboard, a phonetic keyboard, a mouse, a touchpad, a microphone or a video camera, may also be used. Output device 104 includes, for example, a display device, a printer, a speaker and/or any other types of suitable devices. The peripheral storage device 123 may include volatile memory (e.g., random-access memory), non-volatile memory (e.g., read-only memory, hard disk, etc.) or a combination of both. Peripheral storage device 123 may store, for example, a reference database or any other information that may be used by the present framework.

Computer system 106 includes a central processing unit (CPU) 114, an input/output (I/O) unit 110, and a non-transitory memory device 112. Other support circuits, such as a cache, power supply, clock circuits and a communications bus, may also be included in computer system 106. In addition, any of the foregoing may be supplemented by, or incorporated in, application-specific integrated circuits. Examples of computer system 106 include a handheld device, a mobile device, a personal digital assistance (PDA), a workstation, a server, a portable laptop computer, another portable device, a mini-computer, a mainframe computer, a storage system, a dedicated digital appliance, a device, a component, other equipment, or some combination of these capable of responding to and executing instructions in a defined manner.

Memory device 112 stores machine-executable instructions, data, and various programs, such as an operating system 120 and the searching and matching architecture 122 for implementing the techniques described herein, all of which may be processed by CPU 114. As such, the computer system 106 is a general-purpose computer system that becomes a specific purpose computer system when executing the machine-executable instructions. Alternatively, the various techniques described herein may be implemented as part of a software product, which is executed via the operating system 120. Each computer program may be implemented in a high-level procedural or object-oriented programming language, or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

Memory device 112 may be any form of non-volatile memory, including by way of example semiconductor memory devices, such as Erasable Programmable Read-Only Memory (EPROM), Electrically Erasable Programmable Read-Only Memory (EEPROM), flash memory device, magnetic disk, internal hard disk, removable disk, magneto-optical disk, or Compact Disc Read-Only Memory (CD-ROM).

In some instances, memory device 112 can function as an in-memory database to allow seamless access and propagation of high volumes of data in real-time. Parallel processing may further be achieved by using a multicore processor 114 in conjunction with the in-memory database. The in-memory database is a database management system that relies primarily on a system's main memory for efficient computer data storage. More particularly, the data in the in-memory database resides in volatile memory and is not persistently stored on a hard drive, thereby allowing the data to be instantly accessed and scanned at a speed of several megabytes per millisecond.

Column-based data storage may further be implemented in the in-memory database, where data tables are stored as columns of data, in sequence and in compressed memory blocks. This may facilitate faster aggregation of data when calculations are performed on single columns. Alternatively, row-based data storage is also possible. In some implementations, instead of updating entire rows, only fields that have changed will be updated. This avoids having to lock entire data tables during updates to prevent conflicting modifications to set of data. High levels of parallelization may be achieved, which is critical to real-time processing of live data streams and performing constant and substantially simultaneous updates.

Computer system 106 may be communicatively coupled to one or more other computer systems (not shown) via network 132. For example, computer system 106 may operate in a networked environment using logical connections to one or more remote computers (not shown). The remote computer may be another personal computer, a server, a router, a network PC, a peer device or other common network node, and typically includes many or all of the elements described above relative to computer system 106. Computer system 106 also may include a communications card or device 116 (e.g., a modem and/or a network adapter) for exchanging data with network 132 using a communications link 130 (e.g., a telephone line, a wireless network link, a wired network link, or a cable network). Network 132 may be a local area network (LAN) or a wide area network (WAN).

Figure 2:
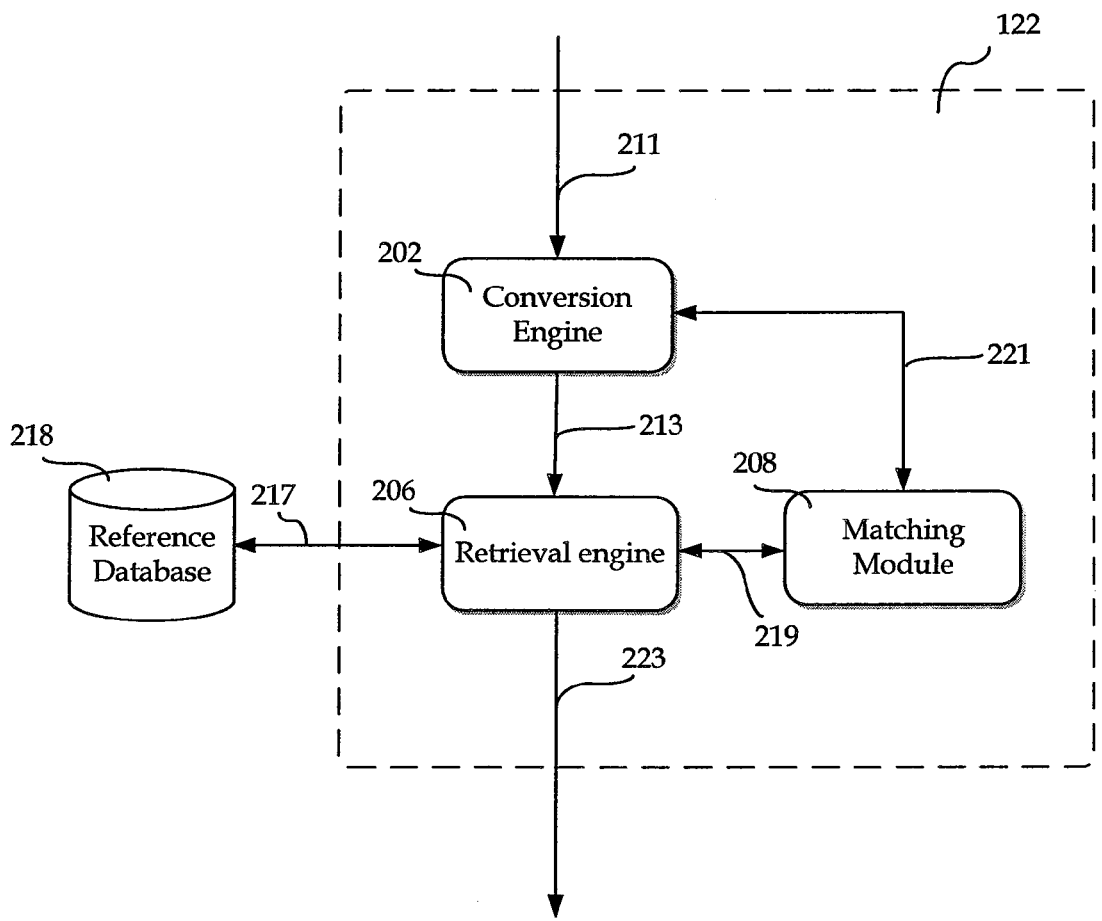
FIG. 2 is a block diagram illustrating an exemplary searching and matching architecture.

FIG. 2 is a block diagram illustrating an exemplary searching and matching architecture 122. In one implementation, the architecture 122 includes a conversion engine 202, a retrieval engine 206 and a matching module 208. The architecture 122 may include other components, such as a user interface for receiving input data. The architecture 122 is language independent. The various components shown in FIG. 2, for example, are generic and may be adapted to be used for any language. For purposes of discussion, however, the architecture 122 is described in the context of Chinese language.

The conversion engine 202 may be configured to receive input data string 211, which includes language text of a given language. In one implementation, the language text comprises one or more ideographic (or logographic) elements, such as Chinese characters. The Chinese characters may be simplified or traditional Chinese characters. Other types of ideographic elements include, but are not limited to, Japanese, Korean, Vietnamese character sequences, or other Asian or non-Asian languages.

The input data string 211 may be provided by a user via a user interface. The user may, for example, manually provide the input data string 211 via an input device 102 (e.g., keyboard, mouse, microphone, graphics tablet, etc.). Alternatively, the input data string 211 may be retrieved from a database, such as an object-oriented database, a relational database, an object-relational database, an in-memory database or any other type of data management system. The database may be stored locally in memory device 112, or remotely in a peripheral storage device 123 or another computer system (not shown). A data mining software component that executes on the computer system 106 may be used to extract the input data strings stored in the database.

The conversion engine 202 may be configured to convert the input data string 211 to Latin-based input data string 215. In one implementation, the conversion engine 202 further includes an image recognition module configured to identify one or more ideographic characters, radicals or strokes in the input data string 211 for conversion into Latin characters. The conversion of ideographic-based data 211 to Latin-based data 213 advantageously allows the direct application of various fuzzy search and match techniques on the Latin-based data, which will be described in more detail later.

In some implementations, the conversion engine 202 is configured to convert the input data string 211 to one or more phonetic spellings 213 of the ideographic elements in the input data string 211. The phonetic spelling includes one or more Latin characters that represent the pronunciation or sounds made when speaking the given language.

Figure 3A:
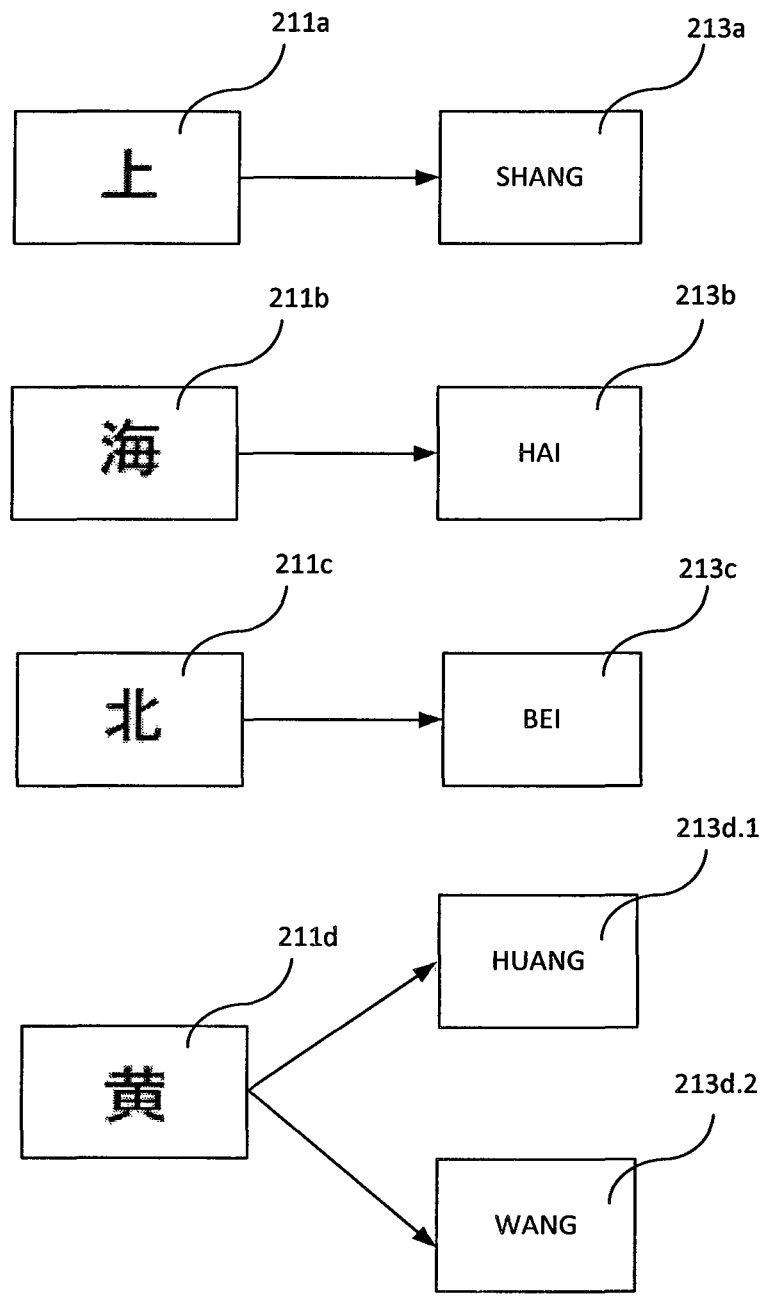
FIG. 3a illustrates exemplary conversions of language text to phonetic spellings.

FIG. 3a illustrates exemplary conversions of input data 211a-d to corresponding Latin-based input data 213a-d in the context of Chinese language. In such case, the conversion engine 202 is configured to convert Hanzi to Pinyin. That is, the ideographic input data 211a-d is Hanzi, while the Latin-based input data 213a-d is Pinyin. It should be noted, however, that the architecture 122 is language independent and may be used for other languages.

The phonetic conversion may be a one-to-one mapping or a one-to-many mapping. For example, input data string 211a is converted to a single phonetic spelling 213a, while input data string 211d is converted to multiple phonetic spellings (213d.1 and 213d.2). The one-to-many mapping arises because of different pronunciations. Different pronunciations may be due to different dialect groups pronouncing the same characters differently. For example, the Mandarin pronunciation of the Chinese character 211d is HUANG, whereas the Guangdong dialect group pronounces the same character 211d as WANG. Different pronunciations may also arise because of different contexts. For example, some characters may be pronounced differently when used in conjunction with different characters in a phrase.

Alternatively or additionally, the conversion engine 202 is configured to convert the input data string 211 to a Latin-based radical representation. The Latin-based radical representation is one or more sets of Latin characters, wherein a Latin character represents a constituent radical of an ideographic element in the input data string 211. The set of Latin characters includes, for example, a set of alphas or Latin letters (e.g., "U," "I," "T," "F," "Q", etc.). It is understood that Latin numerals may also be used.

Figure 3B:
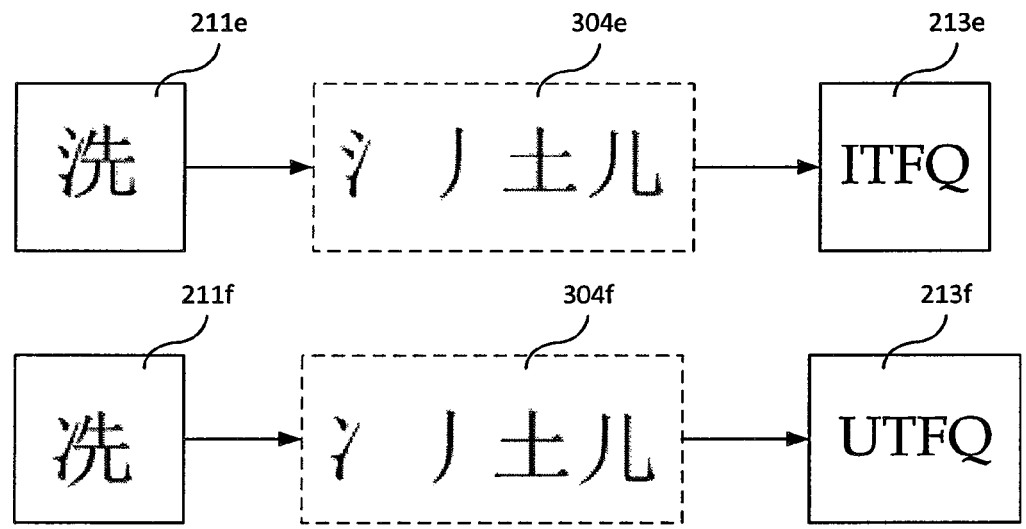
FIG. 3b illustrates exemplary conversions of language text to Latin-based radical strings.
Figure 3B:
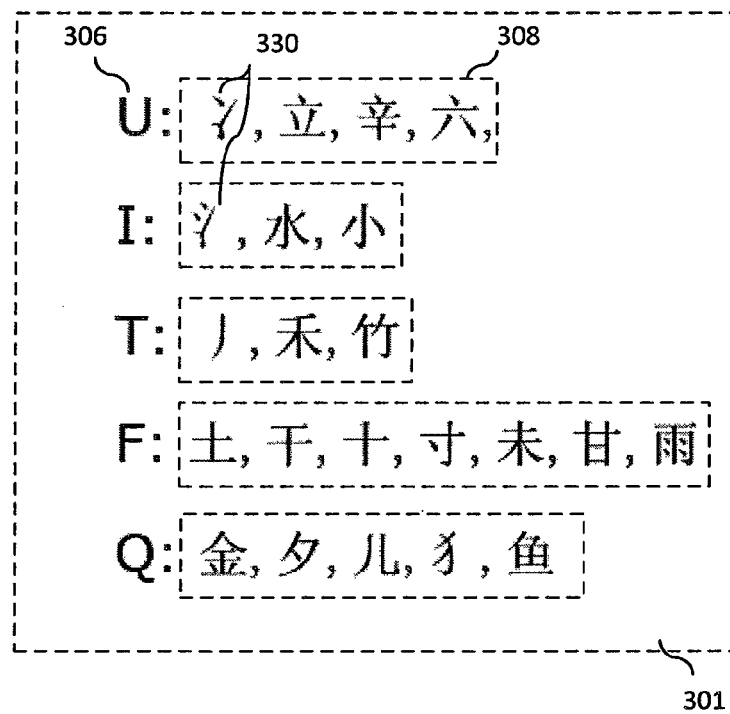

FIG. 3b shows an exemplary conversion of Chinese characters 211e-f to a Latin-based radical representations 213e-f. As shown, the characters 211e-f may be deconstructed into respective constituent radicals (or shapes) 304e-f, and then converted to respective Latin-based radical representations 213e-f. The conversion of radicals 304e-f to radical representations 213e-f may be achieved by looking up a data structure 301. As shown, the data structure 301 may cross reference each alpha 306 with a group of radicals 308. The grouping of radicals 308 may be defined according to the given language. In one implementation, the grouping is heuristically predefined based on the similarity in meaning or appearance of the radicals. The groupings shown in FIG. 3b are merely exemplary, and should not be construed to limit the present framework in any way.

The conversion engine 202 may also be configured to convert the input data string 211 to a Latin-based stroke representation. The Latin-based stroke representation is one or more sets of Latin characters, wherein a Latin character represents a constituent stroke (or shape component) of the ideographic elements in the input data string 211. A stroke is the most fundamental or basic component of a character or symbol of the given language text. A set of strokes may be used to build a radical. Strokes may be defined according to the given language. For example, a Chinese character comprises a set of 5 fundamental strokes: (1) horizontal stroke; (2) vertical stroke; (3) left-falling stroke; (4) right-falling stroke; and (5) turning stroke. Other types of fundamental strokes may also be defined.

Figure 3C:
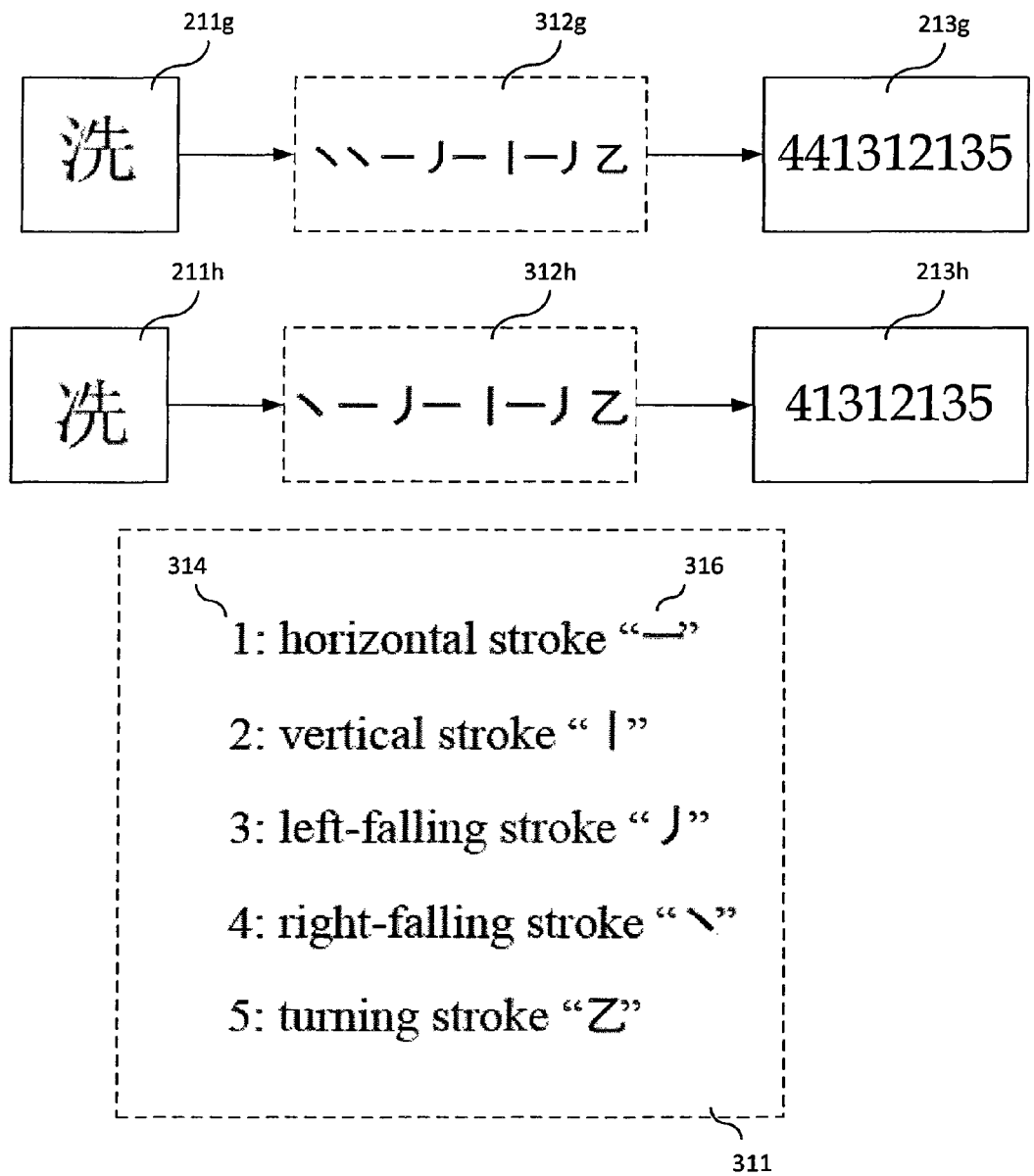
FIG. 3c illustrates exemplary conversions of language text to Latin-based stroke strings.

FIG. 3c shows an exemplary conversion of Chinese characters 211g-h to their respective strokes 312g-h, and subsequently to their respective Latin-based radical representations 213g-h. The conversion of strokes 312g-h to radical representations 213g-h may be achieved by looking up a data structure 311. As shown, the data structure 311 may associate each digit 314 with a stroke 316. Although digits are shown for purposes of illustration, Latin letters or other symbols may also be used. In addition, even though five digits are illustrated, less or more than five Latin characters may also be used. It should also be noted that other methods of converting language text to Latin-based strings may also be applied.

Referring back to FIG. 2, the retrieval engine 206 may be configured to initiate a search for candidate records 217 in a reference database 218. The reference database stores the ground truth information of the system 100. For example, the reference database may store valid addresses or product information. Input data may be validated against the truth information in the reference database 218. The reference database resides in a memory device of a database server, such as computer system 106 or another remote computer system (not shown) that connects to the computer system 106. The reference database server may be, for example, a relational database server, an object-oriented database server, an object-relational database server, a graph database server, a document-oriented database server, etc.

FIG. 4a shows a portion of an exemplary reference database 218. Each record in the database 218 may include a unique identifier 402 and a value 404. The value 404 is the candidate string, which includes the original language text. Although a Latin-based language text is shown for purposes of illustration, it is understood that the language text may also be non-Latin-based or include one or more ideographic elements (e.g., Chinese characters).

Turning back to FIG. 2, the retrieval engine 206 may issue a query statement to the reference database server to retrieve one or more potentially matching candidate records 217. The query statement may conform to a query language that is supported by the reference database server. One example of a query language is structured query language (SQL), which is designed for managing data in relational databases. It is understood that other types of query languages may also be used.

FIG. 4b shows an exemplary SQL query statement 412 that may be issued by the retrieval engine 206. A query operation in SQL is performed with the declarative SELECT keyword. The query statement includes a function call SCORE( ) which invokes the matching module 208 to compute a FUZZY match score. The match score computation will be described in more detail in the following description. The WHERE clause includes the value name (e.g., VALUE), the Latin-based input data string (e.g., "hans") and the minimum FUZZY match score value, which are provided as comparison predicates to constrain the search. It is understood that such query language elements are merely exemplary, and other statements, keywords, expressions, and/or clauses may also be used to specify other query conditions.

Turning back to FIG. 2, the matching module 208 may be invoked by the retrieval engine 206 to compute the fuzzy match score of each retrieved candidate record 219. The matching module 208 evaluates the degree of similarity (or match) between the language text associated with the candidate record (i.e. candidate string) and the input data. A candidate string yielding the highest fuzzy match score indicates that it is most approximately matches the input data 211.

In some implementations, the matching module 208 initiates a conversion of the candidate string to a Latin-based representation of the language text prior to computing its match score. The conversion may be performed on-the-fly by providing the candidate string 221 to the conversion engine 202.

The matching module 208 may be configured to determine a fuzzy match score based on a first set of features associated with the input data string and a second set of features associated with the candidate string, as will be described in more detail later. The resulting match score is returned to the retrieval module 206, which compiles and outputs the results 223.

The results 223 may include, for example, language text of one or more candidate records with the highest match scores. FIG. 4c shows an exemplary results table 223 that may be returned by the exemplary query statement 412. The results table 223 includes candidate records with a fuzzy match score greater than 0.5. Since "hans" has a match score of 0.17 when compared to the Latin-based input data string "hans", the candidate record containing "haas" has been excluded from the results table 223. The match score computation will be described in more detail in the following sections.

Exemplary Method

Figure 5:
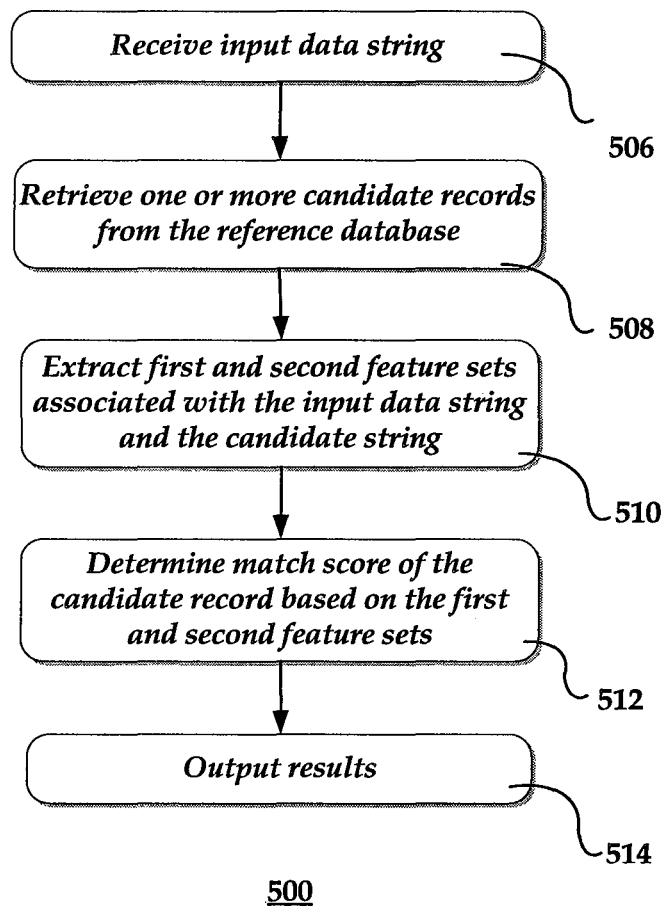
FIG. 5 shows an exemplary searching and matching method.

FIG. 5 shows an exemplary searching and matching method 500 which may be implemented by the system 100. It is to be noted that in the discussion of FIG. 5 and subsequent figures, continuing reference may be made to elements and reference numerals shown in FIGS. 1-4.

At 506, the computer system 106 receives an input data string. The input data string includes language text, such as symbolic, ideographic or logographic elements of a given language (e.g., Chinese, Korean, Japanese or Vietnamese). The conversion engine 202 may convert the input data string to a Latin-based input data string. The Latin-based input data string includes one or more letters (a, b, c, etc.) or numerals (1, 2, 3, etc.) from the Latin alphabet. In some implementations, the Latin-based input data string includes the phonetic spelling of the ideographic elements in the input data string 211. In the context of Chinese language, for example, Hanzi input data may be converted to Pinyin. As discussed previously, the present framework advantageously provides dialect support by converting a given language text string to one or more phonetic spellings.

At 508, the retrieval engine 206 retrieves one or more candidate records from the reference database 218. In one implementation, the retrieval engine 206 retrieves each record in the reference database to search for candidate records that fulfill certain pre-defined constraints (e.g., match score>0.5). For instance, the retrieval engine 206 may issue a query statement, such as the one described with reference to FIG. 4b, to retrieve the candidate records. As mentioned previously, each candidate record includes a candidate string, which may be the original language text containing one or more ideographic elements (e.g., Chinese characters).

At 510, first and second feature sets associated with the input data string and the candidate string respectively is extracted. The extraction may be performed by the matching module 208 when, for example, invoked by the retrieval engine 206. The first set of features is descriptive of the input data string, while the second set of features is descriptive of the candidate string. The feature sets may be used to compute the match score between the input data string and the candidate string. Generally, the more features there are in the feature sets, the more information is stored and the more precise the match score can be.

In accordance with one implementation, the first and second features sets include phonetic features that describe the "sound" or pronunciation of the respective language text. Exemplary phonetic features include, for example, the phonetic spelling, the phonetic key, or a combination thereof. By including such phonetic features in each feature set, the pronunciation (or sound) is taken into account to facilitate fuzzy (or approximate) matching and to yield a more precise match score.

The phonetic key may be derived from the phonetic spelling of ideographic elements in the language text. In some implementations, the computer system 106 executes a set of one or more pre-defined phonetic routines to encode the phonetic spelling to one or more corresponding phonetic keys. The phonetic routines include, for example, the silent routine and the sounds-like routine. It is understood that other types of phonetic routines may also be applied.

The silent routine may include parsing a phonetic spelling and removing any silent elements from the phonetic spelling. An element refers to one or more letters, vowels, consonants, or a combination thereof. A silent element may be an element that can be omitted without substantially affecting the pronunciation of the language text. The silent elements may be pre-defined according to the type of language processed, and stored in a data structure (e.g., look-up table). For example, in the context of Chinese language, exemplary silent elements include "H," "G," "I" and "U." The consonant "UANG" may be replaced by the consonant "ANG" by removing the silent element "U." Additional rules may also be defined in the silent routine. For example, the silent element may not be removed if it is the first or last remaining element of the Latin-based string.

Figure 6A:
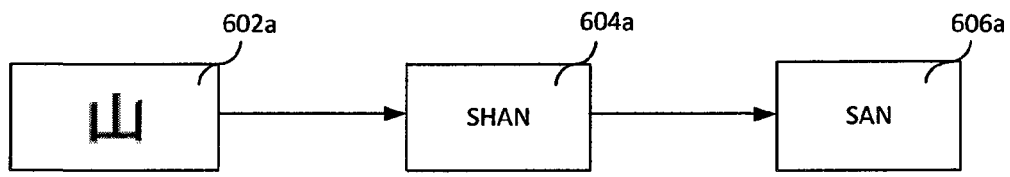
FIGS. 6a-e illustrate exemplary conversions of language text to phonetic keys.
Figure 6A:
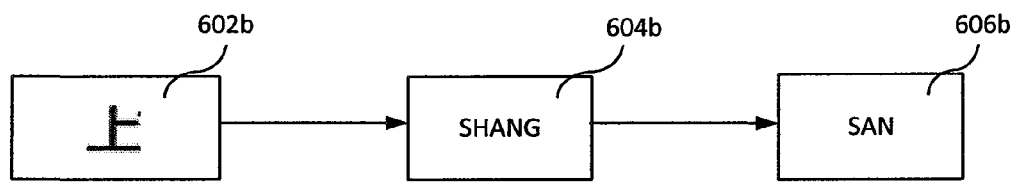
Figure 6A:
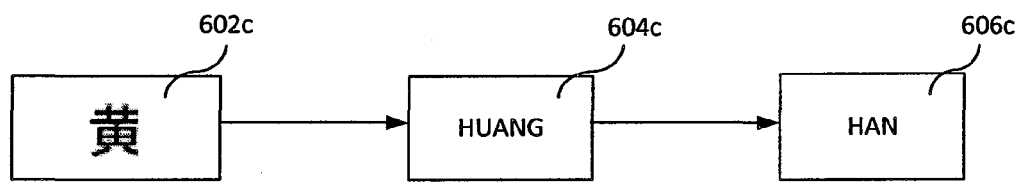
Figure 6A:
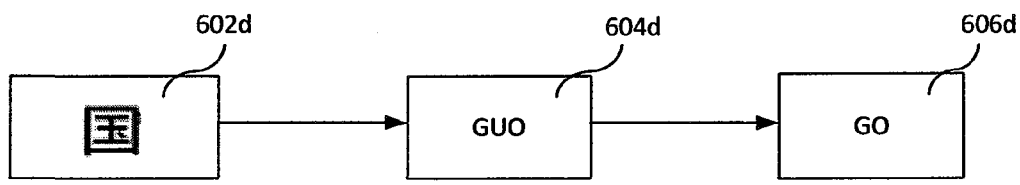
Figure 6A:
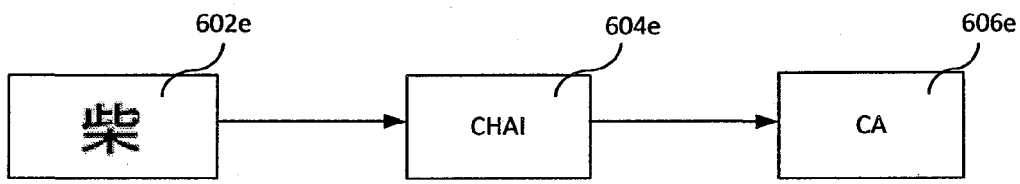

FIGS. 6a(i)-(v) illustrate exemplary applications of the silent routine. The conversion engine 202 may convert the ideographic element 602 to the Latin-based string 604, and the matching module 208 may execute the silent routine to convert the Latin-based string 604 to the phonetic key 606. For example, FIG. 6a(i) illustrates an exemplary application where the silent routine parses the Latin-based string 604a and recognizes the element "H" as a silent element. Since "SH" and "S" are pronounced similarly, the silent-letter routine removes the silent element "H" from the phonetic spelling "SHAN" (604a), thereby generating the phonetic key "SAN" (606a).

Another exemplary routine that may be used in the phonetic encoding process is the sounds-alike routine. The sounds-alike routine may include parsing a Latin-based string and replacing any element that has a corresponding similar sounding element. Like silent letters, the sounds-alike mapping may be pre-defined according to the type of language processed, and stored in a data structure (e.g., look-up table). For example, in the context of Chinese language, "X" may be replaced by a sounds-alike element "S," and "J" may be replaced by a sounds-alike element "Z." Other types of replacement rules are also useful.

Figure 6B:
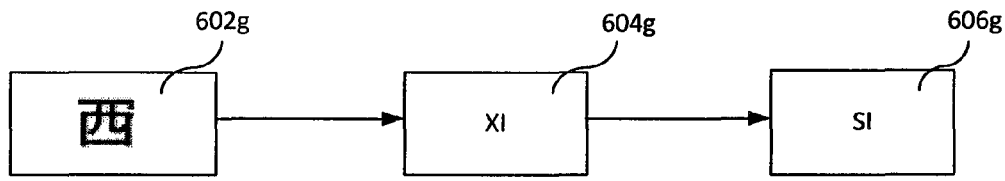
Figure 6B:
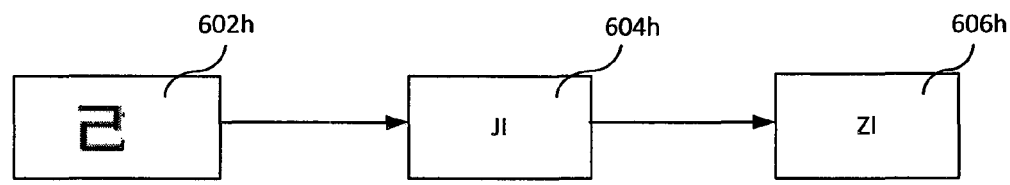
Figure 6B:
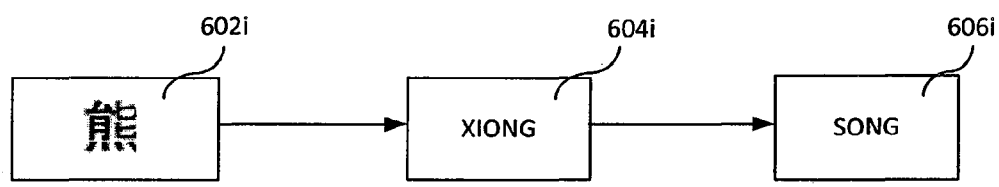

FIG. 6b illustrates various examples of replacing sounds-alike elements. In FIG. 6b(i), for example, the Latin-based string "XI" may be converted to the phonetic key "SI" by replacing the element "X" with its sounds-alike element "S." In another example shown in FIG. 6b(ii), the element "J" may be replaced by its sounds-alike element "Z" to generate the phonetic key "ZI" (606h). In yet another example illustrated in FIG. 6b(iii), the silent routine removes the element "I" and the sounds-like routine replaces the element "X" with its sounds-alike element "S" to derive the phonetic key "SONG" (606i).

Figure 6C:
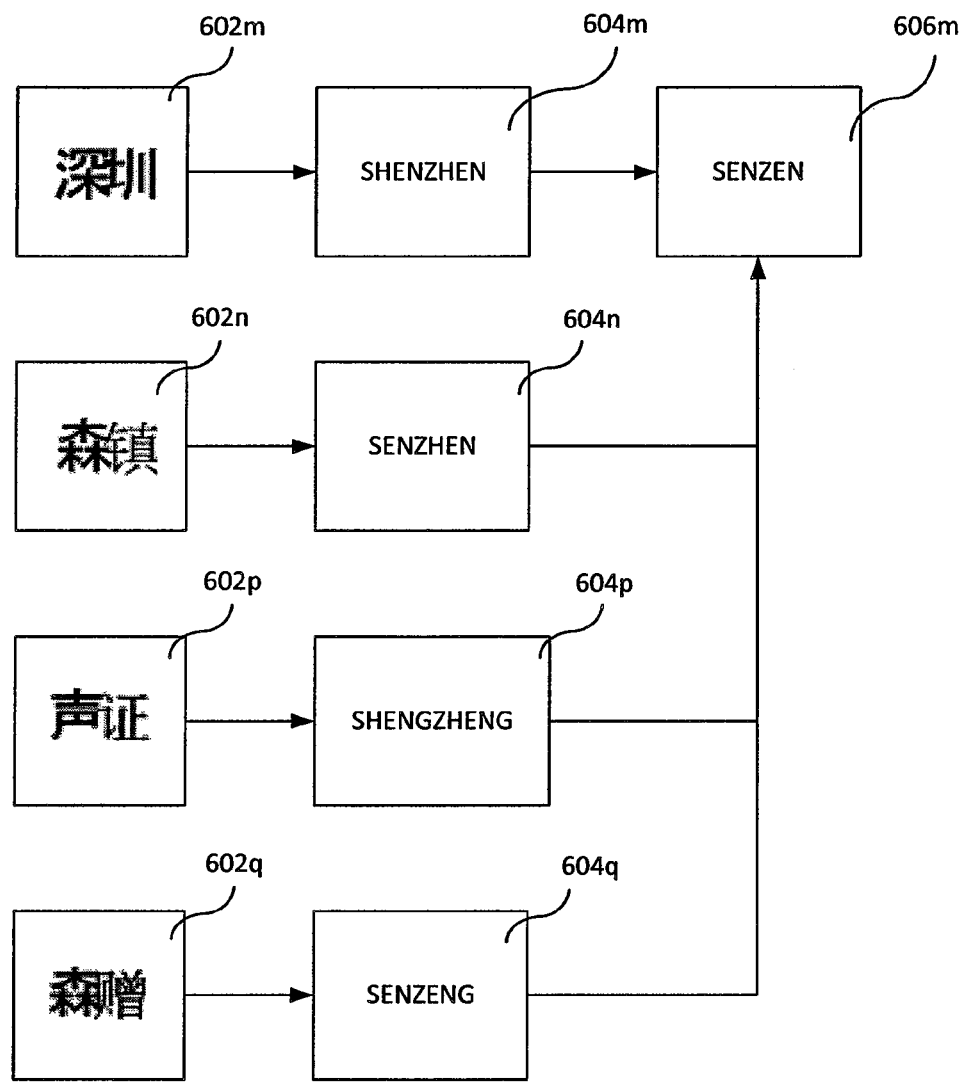

FIG. 6c illustrates an exemplary conversion of similar-sounding language text (602m, 602n, 602p and 602q) to a common phonetic key (606m). By generating the same phonetic key for similar-sounding language text, language text that sounds similar will have higher match scores.

Figure 6D:
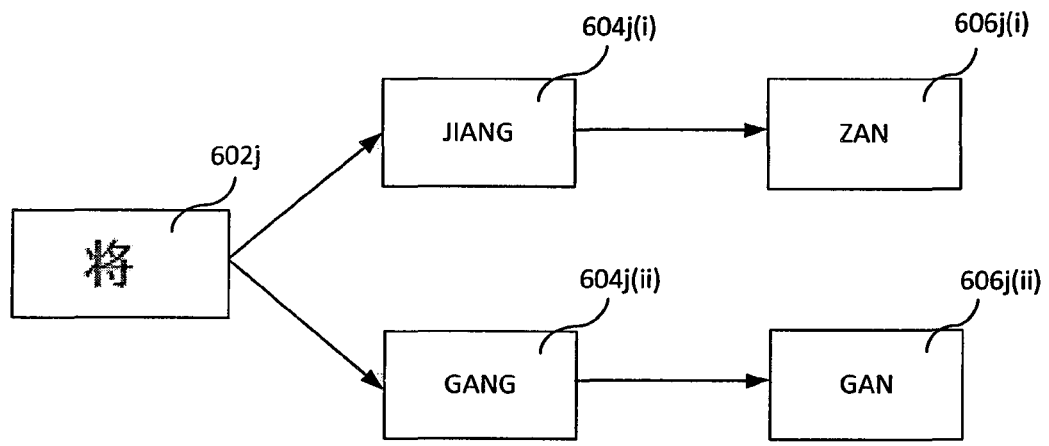
Figure 6D:
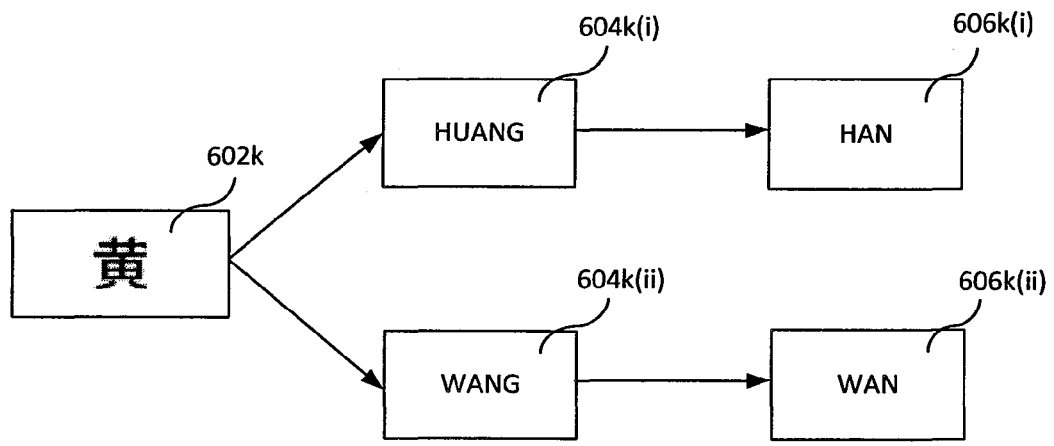

FIG. 6d(i) shows an exemplary mapping of an ideographic element 602j to multiple phonetic keys 606j(i)-(ii). The generation of multiple phonetic keys advantageously provides dialect support. In the context of Chinese language, dialects may include, but are not limited to, Shanghainese, Cantonese, Taiwanese, Hakka, Hokkien, Teochew, Hainanese, etc. Referring to FIG. 6d(i), for example, the standard Mandarin pronunciation of the character 602j is "JIANG" (604j(i)), while people from Shanghai pronounce the same Chinese character 602j as "GANG" (604j(ii)). Thus, two phonetic keys "ZAN" and "GAN" (606j(i)-(ii)) may be derived from the respective Latin-based input strings (604j(i)-(ii)). FIG. 6d(ii) shows another example of multiple phonetic-key generation. The ideographic element 602k may be pronounced as "HUANG" (604k(i)) in standard Mandarin, and "WANG" (604k(ii)) in Cantonese. Thus, two phonetic keys "HAN" and "WAN" (606k(i)-(ii)) may be generated for the respective dialects. It is understood that more than two phonetic keys may also be generated to accommodate other dialects.

Figure 6E:
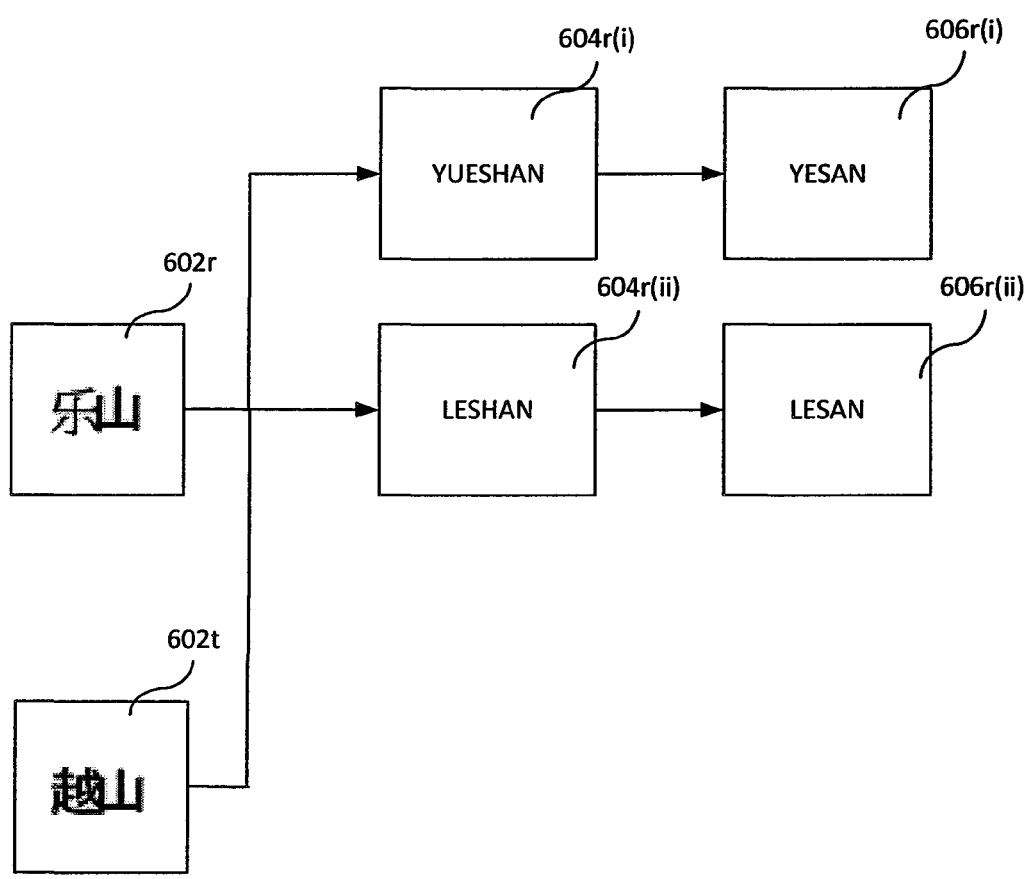

FIG. 6e shows yet another exemplary conversion of data strings (606r and 602t) to phonetic keys (606r(i)-(ii)). Multiple phonetic keys "YESAN" (606r(i)) and "LESAN" (606r(ii)) may be generated based on either the data string 602r or 602t. A first feature set may be generated for each of the multiple phonetic keys derived from the input data string and a second feature set may be generated for each of the multiple phonetic keys derived from the candidate string. Candidate strings that have the same pronunciation but different ideographic characters may be retrieved from the reference database. In addition, or alternatively, candidate strings with the same ideographic characters but different pronunciations may also be retrieved. This advantageously provides dialect support in cases where a data string has different pronunciations.

In accordance with one implementation, the first and second features sets include shape features that describe the "look" or appearance of the respective language text. Exemplary shape features include, for example, the original ideographic elements (or language text), the radical representation, the radical key, the stroke representation and/or the stroke key. By including such shape features in the feature set, the appearance (or look) is taken into account to facilitate fuzzy (or approximate) matching and to yield a more precise match score. It should be noted that the feature sets may also include phonetic features, as described previously, to support both "look-like" and "sound-like" fuzzy matching.

A radical key is a Latin-based string that is derived from a Latin-based radical representation. The radical representation is a set of Latin characters or alphas that may be generated by the conversion engine 202. As discussed previously, each Latin character or alpha represents a constituent radical of an ideographic element. In some implementations, the radical key includes the Latin-based radical representation generated by the conversion engine 202 with no modifications. Alternatively, various rules may be heuristically pre-defined to convert the Latin-based radical representation to a radical key.

For example, referring to FIG. 3b, similar-looking radicals 330 may be grouped together and mapped to a common alpha (e.g., "U"). In other words, the matching module 208 may be configured to parse the set of Latin-based radical representation and replace any character associated with a radical that has a corresponding looks-alike radical. Thus, similar looking ideographic characters 211e and 211f are converted to a common radical key (e.g., UTFQ) by replacing "I" with "U". This advantageously introduces some "fuzziness" in the match score computation of the candidate records. Multiple radical keys may also be generated for a single input data string according to the different types of groupings.

A stroke key is a Latin-based string that is derived from a Latin-based stroke representation. The stroke representation is a set of Latin characters or digits generated by, for instance, the conversion engine 202. As discussed previously, each Latin character or digit may represent a constituent stroke of an ideographic element. In some implementations, the stroke key includes the stroke representation generated by the conversion engine 202 with no modifications. Alternatively, various rules may be heuristically pre-defined to convert the stroke representation to a stroke key. For instance, the matching module 208 may be configured to parse the Latin-based stroke representation and replace any character associated with a stroke that has a corresponding looks-alike stroke. As yet another example, the matching module 208 may remove any duplicate character associated with a duplicate stroke in the stroke representation. For instance, in the example shown in FIG. 3c, the ideographic element 211g may be encoded to the stroke key "41312135" by removing "4" which is associated with the duplicate stroke. This allows similar-looking ideographic elements 211g and 211h to be encoded to the same stroke key. By incorporating such stroke keys in the feature sets, candidate strings that look similar to the input data string will be assigned a higher match score than less similar-looking candidate strings.

In yet another implementation, the first and second feature sets include n-grams of the phonetic features and/or shape features. As discussed previously, an n-gram is a set of n consecutive characters that are extracted from a string or given sequence of text. An n-gram can have a size of n, where n is a positive integer equal to or larger than 1. For purposes of illustration, the present framework is described using monogram, bi-gram, or a combination of both. However, it should be noted that the present framework may also be applied to n-gram of other sizes, such as tri-gram.

N-grams models are extremely effective in modeling language data. One of their core advantages is its relative simplicity and ability to scale up—by simply increasing n, a model can be used to store more context information within a well-understood space of language data. More similar strings will have a higher proportion of n-grams in common than less similar strings. Thus, the similarity between two strings corresponds to the number of n-grams that are common to both strings.

FIG. 7a illustrates exemplary generation of n-grams 704a-d from a string 702. The string 702 may be Latin-based or non-Latin-based. For instance, the string 702 may be the original language text (e.g., ideographic elements), Latin-based representation of the language text (e.g., phonetic spelling) or the key generated based on the Latin-based representation of the language text (e.g., phonetic key, radical key or stroke key). By converting each string 702 to a set of n-grams 704a-c, the string may be compared to other strings in an efficient manner. More similar strings will share a higher proportion of n-grams than less similar strings. Therefore, similarity between two strings may be derived from the number of n-grams that are common to both strings.

Referring to FIG. 7a, mono-grams 704a, bi-grams 704b, a combination of mono-grams and bi-grams 704c, a combination of mono-grams, bi-grams and extra-grams 704d, may be extracted from the string 702. For instance, the string "hans" may be split into mono-grams or single characters "h", "a", "n" and "s". It can also be split into bi-grams or sequences of 2 characters "ha", "an" and "ns". In addition, it can be further split into extra-grams so as to explicitly model the beginning and end or a text, such as "_h" and "s_". It is understood that other n-grams or combinations may also be extracted.

Figure 7B:
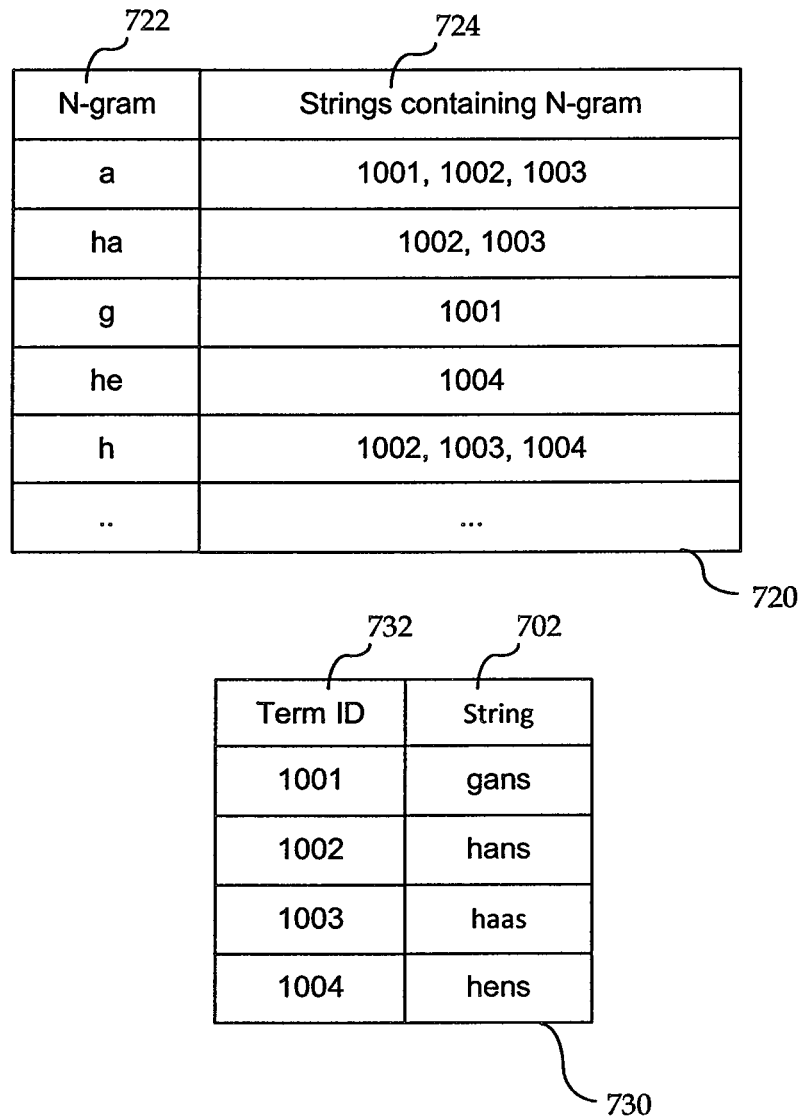
FIG. 7b shows an exemplary n-gram index.

Such n-grams may be extracted during the search by the matching module 208, or pre-generated and stored in the reference database 218 as an index (or any other data structure) in order to speed up the search. Similarly, the phonetic and shape features may also be generated on-the-fly, or pre-generated and stored in the reference database 218 as an index. FIG. 7b shows an exemplary n-gram index 720 corresponding to the strings 702 illustrated in FIG. 7a. The n-gram index 720 maps each n-gram 722 to the corresponding strings 724 in a word dictionary. Each of the strings 724 may be associated with a unique term identifier (ID) 732 by a lookup table 730. Advantageously, the n-gram index 720 may be pre-generated and applied to all records in the reference database 218 to improve the speed of the searching and matching process. Additional entries may be added to the n-gram index 720 when the word dictionary expands.

Turning back to FIG. 5, at 512, the matching module 208 determines the match score based on the first and second feature sets. The match score of the candidate record represents how similar the language text of the input data and the language text of the candidate record are. In some implementations, the similarity is determined by comparing the Latin-based input data string and the Latin-based representation of the language text (or substring) in a candidate record.

Each of the first and second feature sets may include multiple feature sub-sets. Each feature sub-set is a grouping of a particular type of feature. In addition, each of the first and second feature sets may include both phonetic and shape features. FIG. 8 illustrates an exemplary method of computing a match score based at least in part on phonetic and shape features. In this example, it is assumed that the ideographic elements "上海" 801a correspond to the input data string, while the other strings 801b-c correspond to candidate records.

As shown in FIG. 8, each of the first and second feature sets includes a first feature sub-set 811 of mono-grams of ideographic elements, a second feature sub-set 812 of bi-grams of phonetic spellings, and a third feature sub-set 813 of mono-grams of phonetic keys. A match ratio is first determined for each feature sub-set. The match ratio refers to the number of features in a given feature sub-set that are common to both feature sets compared to the total number of features in the given sub-set of the first feature set. For example, the match ratio between the input data string 801a and the candidate string 801b for the first feature sub-set 811 is 0/2 since none of the mono-grams match. The match ratio for the second feature sub-set 812 is 7/7 , while the match ratio for the third feature sub-set 813 is 1/1.

To generate the match score, the weighted sum of the match ratios may be computed. For example, an equal weight of 1/3 may be assigned to each of the three match ratios. Accordingly, the match score of the candidate string 801b is (1/3*0/2+1/3*7/7+1/3*1/1)=67%. As shown in FIG. 8, the candidate string 801c that sounds and looks most similar to the input data string 801a has the highest match score of 74%.

FIGS. 9a-c illustrate various exemplary techniques of computing the match score based at least in part on shape features. In these examples, it is assumed that the ideographic element "洗" 901a corresponds to the input data string, while the ideographic element "洗" 901b corresponds to a candidate record.

Referring to FIG. 9a, the match score 914 is computed based on the match ratio of the radical bi-grams 912. For instance, since two bi-grams (TF, FG) out of a total of three bi-grams (IT, TF, FG) are common between the candidate character 901b and input character 901a, the match ratio is 2/3 and the corresponding match score of 67%.

FIG. 9b shows how the match score 914 may be computed based on the original Chinese character 901 and the radical key 916. Each feature set includes two feature sub-sets. The first feature sub-set includes the original Chinese character 901, while the second feature sub-set includes the radical key. The match score 914 is determined by computing the weighted sum of match ratios of the feature sub-sets. For instance, the candidate string 901b has a match score of 50%, since the first feature sub-set has a match ratio of 0/1, and the second feature subset has a match ratio of 1/1. Although equal weights (e.g., ½) are assigned to the match ratios in this example, non-equal weights may also be assigned.

FIG. 9c shows how the match score 914 may be computed based on the original Chinese character 901 and the bi-grams of the radical representation 918. Each feature set includes two feature sub-sets. The first feature sub-set includes the original Chinese character 901, while the second feature sub-set includes the radical bi-grams 918. The match score is determined by computing the weighted sum of match ratios of the feature sub-sets. For instance, the candidate string 901b has a match score of 33%, since the first feature sub-set has a match ratio of 0/1 and the second feature sub-set has a match ratio of 2/3. Although equal weights (e.g., ½) are assigned to the match ratios in this example, non-equal weights may also be assigned.

FIGS. 10a-c illustrate various exemplary techniques of computing the match score based at least in part on shape features. In these examples, it is assumed that the ideographic element "洗" 1001a corresponds to the input data string, while the ideographic element "洗" 1001b corresponds to a candidate record.

Referring to FIG. 10a, the match score 1016 is computed based on the match ratio of the bi-grams of the stroke representation 1012. For instance, since seven bi-grams (41, 13, 31, 12, 21, 13, 35) out of a total of eight bi-grams (44, 41, 13, 31, 12, 21, 13, 35) are common between the candidate character 1001b and input character 1001a, the match ratio is 7/8 and the corresponding match score of 88%.

FIG. 10b shows how the match score 1016 may be computed based on the original Chinese character 1001 and the stroke key 1004. Each feature set includes two feature sub-sets. The first feature sub-set includes the original Chinese character 1001, while the second feature sub-set includes the stroke key 1004. The match score 1016 is determined by computing the weighted sum of match ratios of the feature sub-sets. For instance, the candidate string 1001b has a match score of 50%, since the first feature sub-set has a match ratio of 0/1, and the second feature subset has a match ratio of 1/1. Although equal weights (e.g., ½) are assigned to the match ratios in this example, non-equal weights may also be assigned.

FIG. 10c shows how the match score 1016 may be computed based on the original Chinese character 1001 and the bi-grams of the stroke representation 1012. Each feature set includes two feature sub-sets. The first feature sub-set includes the original Chinese character 1001, while the second feature sub-set includes the stroke bi-grams 1012. The match score is determined by computing the weighted sum of match ratios of the feature sub-sets. For instance, the candidate string 1001b has a match score of 44%, since the first feature sub-set has a match ratio of 0/1 and the second feature sub-set has a match ratio of 7/8. Although equal weights (e.g., ½) are assigned to the match ratios in this example, non-equal weights may also be assigned.

It should be noted that the combinations described herein are merely exemplary, and the features sets for computing the match score may include any combination of phonetic features, shape features, n-grams of phonetic features, and/or n-grams of shape features. By incorporating both phonetic and shape features into the feature sets, both sound-like and look-like fuzzy searches may be performed and the resulting fuzzy match score becomes more precise.

Turning back to FIG. 5, at 514, the matching module 208 presents the output results 223. The output results 223 may include language text from the best matching candidate record, or a list of candidate records with good enough match scores (i.e. above a certain predetermined threshold). In some implementations, the system 100 presents the output results 223 to a user via an output device (e.g., computer monitor). A user interface may be provided to allow the user to view and select the best matching candidate string. Alternatively, the system 100 may automatically replace the input string with the candidate string that is associated with the highest match score.

In one implementation, the present framework is implemented in data cleansing applications to improve the quality of customer's data. One example of such data cleansing application is address cleansing, which validates input data entered in the address field of customer data records. Other types of records and data fields, such as the name, phone number or product part description in sales records, may also be validated. The input data may be validated via batch mode, or via a web application which allows the user to input data. Validation may be performed against truth information stored in a reference database. The truth information may be internal to the data warehouse (e.g., customer database) or obtained from external sources (e.g., valid addresses from postal offices). Errors in the input data fields may be corrected by identifying the correct reference data from the reference database before the data is stored. A suggestion list of potentially correct candidates may be presented to the user for selection. Alternatively, the best matching candidate may be presented to the user.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of matching data, comprising:
   receiving an input data string comprising one or more first ideographic elements;
   receiving a candidate string comprising one or more second ideographic elements;
   extracting a first feature set associated with the input data string and a second feature set associated with the candidate string, wherein the first and second feature sets comprise n-grams of phonetic and shape features; and
   determining a match score of the candidate string based on the first and second feature sets.

2. A computer-implemented method of matching data, comprising:
   extracting a first feature set associated with an input data string comprising one or more first ideographic elements, wherein extracting the first feature set comprises extracting at least one first phonetic feature from the input data string;
   extracting a second feature set associated with a candidate string comprising one or more second ideographic elements, wherein extracting the second feature set comprises extracting at least one second phonetic feature from the candidate string; and
   determining a match score of the candidate string based on the first and second feature sets.

3. The method of claim 2 wherein extracting the first feature set comprises extracting one or more n-grams of the first phonetic feature based on the input data string, and extracting the second feature set comprises extracting one or more n-grams of the second phonetic feature based on the candidate string.

4. The method of claim 2 wherein extracting the first phonetic feature from the input data string comprises extracting a first phonetic spelling of the input data string, and extracting the second phonetic feature from the candidate string comprises extracting a second phonetic spelling of the candidate string.

5. The method of claim 2 wherein extracting the first phonetic feature from the input data string comprises extracting a first phonetic key based on a first phonetic spelling of the input data string, and extracting the second phonetic feature from the candidate string comprises extracting a second phonetic key based on a second phonetic spelling of the candidate string.

6. The method of claim 5 wherein extracting the first and second phonetic keys comprises removing any non-space silent element from the first and second phonetic spellings.

7. The method of claim 6 wherein the silent element comprises a letter "H," "G," "I," or, "U."

8. The method of claim 5 wherein extracting the first and second phonetic keys comprises replacing any element in the first and second phonetic spellings that has a corresponding sounds-alike element.

9. The method of claim 2 wherein each of the first and second feature sets comprises multiple feature sub-sets.

10. The method of claim 9 wherein determining the match score of the candidate string comprises:
determining match ratios of the feature sub-sets of the second feature set; and
computing a weighted sum of the match ratios.

11. A non-transitory computer-readable medium having stored thereon a program code, the program code executable by a processor to:
extract a first feature set associated with an input data string comprising one or more first ideographic elements, wherein extracting the first feature set comprises extracting a first shape feature from the input data string;
extract a second feature set associated with a candidate string comprising one or more second ideographic elements, wherein extracting the second feature set comprises extracting a second shape feature from the candidate string; and
determine a match score of the candidate string based on the first and second feature sets.

12. The computer-readable medium of claim 11 wherein extracting the first feature set comprises extracting a first radical key from a radical representation of the input data string, and extracting the second feature set comprises extracting a second radical key from a radical representation of the candidate string.

13. The computer-readable medium of claim 12 wherein extracting the first and second radical keys comprises replacing any Latin character that is associated with a radical that has a corresponding looks-alike radical.

14. The computer-readable medium of claim 11 wherein the first shape feature comprises a stroke representation of the input data string, and the second shape feature comprises a stroke representation of the candidate string.

15. The method computer-readable medium of claim 11 wherein extracting the first feature set comprises extracting a first stroke key from a stroke representation of the input data string, and extracting the second feature set comprises extracting a second stroke key from a stroke representation of the candidate string.

16. The computer-readable medium of claim 15 wherein extracting the first stroke key comprises removing any duplicate Latin character from the stroke representation of the input data string and extracting the second stroke key comprises removing any duplicate Latin character from the stroke representation of the candidate string.

17. The computer-readable medium of claim 11 wherein the first shape feature comprises the first ideographic element and the second shape feature comprises the second ideographic element.

18. The computer-readable medium of claim 11 wherein extracting the first feature set comprises extracting one or more n-grams of the first shape feature based on the input data string, and extracting the second feature set comprises extracting one or more n-grams of the second shape feature based on the candidate string.

19. The computer-readable medium of claim 11 wherein the first shape feature comprises a radical representation of the input data string, and the second shape feature comprises a radical representation of the candidate string.

20. A system for matching data, comprising:
a non-transitory memory device for storing computer readable program code; and
a processor in communication with the memory device, the processor being operative with the computer readable program code to:
extract a first feature set associated with an input data string comprising one or more first ideographic elements by at least extracting a first shape feature from the input data string;
extract a second feature set associated with a candidate string comprising one or more second ideographic elements by at least extracting a second shape feature from the candidate string; and
determine a match score of the candidate string based on the first and second feature sets.

21. The system of claim 20 wherein the processor is operative with the computer readable program code to extract the first feature set by extracting one or more n-grams of the first shape feature, and extract the second feature set by extracting one or more n-grams of the second shape feature.

22. The system of claim 20 wherein the first shape feature comprises a radical representation of the input data string, and the second shape feature comprises a radical representation of the candidate string.

* * * * *